US008244828B2

(12) United States Patent
Anderson et al.

(10) Patent No.: US 8,244,828 B2
(45) Date of Patent: Aug. 14, 2012

(54) DIGITAL GUIDE SYSTEM

(75) Inventors: Stephanie Black Anderson, Chicago, IL (US); John A. Blanchard, III, Algonquin, IL (US); Blaine H. Dolph, Western Springs, IL (US); Jennifer Martin, Chicago, IL (US); John Nathan Tolva, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 3070 days.

(21) Appl. No.: 10/650,903

(22) Filed: Aug. 28, 2003

(65) Prior Publication Data

US 2005/0066358 A1    Mar. 24, 2005

(51) Int. Cl.
*G06F 15/167* (2006.01)
(52) U.S. Cl. ........................................ 709/217
(58) Field of Classification Search .................. 709/217
See application file for complete search history.

(56) References Cited

U.S. PATENT DOCUMENTS

| 5,819,227 | A | 10/1998 | Obuchi | 705/1 |
| 6,009,429 | A | 12/1999 | Greer et al. | 707/10 |
| 6,529,824 | B1 | 3/2003 | Obradovich | 701/208 |
| 6,721,706 | B1* | 4/2004 | Strubbe et al. | 704/275 |
| 6,963,841 | B2* | 11/2005 | Handal et al. | 704/270 |
| 2002/0069312 | A1* | 6/2002 | Jones | 711/100 |
| 2003/0069803 | A1* | 4/2003 | Pollitt | 705/26 |
| 2003/0158735 | A1* | 8/2003 | Yamada et al. | 704/260 |
| 2003/0212759 | A1* | 11/2003 | Wu | 709/218 |

* cited by examiner

*Primary Examiner* — Larry Donaghue
*Assistant Examiner* — Nicholas Taylor
(74) *Attorney, Agent, or Firm* — Yee & Associates, P.C.; Mark C. Vallone; Rudolf O. Siegesmund

(57) ABSTRACT

A Digital Guide System (DGS) assembles and delivers contextual, narrative content information to an end-user requiring a guided or self-guided tour of a physical space. DGS consists of a Content Management System application (CMS), a Channel Administration application (CA), a Content Repository (CR) and a Channel Device application (CDA). CMS allows developers to build content information in discrete narratives using a modular story-building methodology. The CMS stores all information relevant to editorial control and content development in the CR. The CA is a browser-based registration and device management application that delivers content information to devices in channels designated for that content information by the CMS. The CDA allows the user to navigate through the content information using the modular story based organization and collects usage information in a user log for transmittal to the CA.

13 Claims, 17 Drawing Sheets

| | | 300 | 360 | 361 | 362 | 363 | 364 | 365 |
|---|---|---|---|---|---|---|---|---|
| 302 | Role Name: | | | | | | | |
| 304 | Languages: | ☐ English | ☐ French | | ☐ Arabic | | ☐ Arabic Vowelized | |
| 306 | Access Rights: | | | | | | | |
| 310 | Elements | | ☐ Add | ☐ Edit | ☐ Delete | ☐ Approve | ☐ Publish | ☐ View |
| 312 | Description | | ☐ Add | ☐ Edit | ☐ Delete | ☐ Approve | | |
| 313 | Attributes | | ☐ Add | ☐ Edit | ☐ Delete | ☐ Approve | | |
| 314 | Dates | | ☐ Add | ☐ Edit | ☐ Delete | ☐ Approve | | |
| 315 | Bibliographies | | ☐ Add | ☐ Edit | ☐ Delete | ☐ Approve | | |
| 316 | Representations | | ☐ Add | ☐ Edit | ☐ Delete | ☐ Approve | | |
| 317 | Related Elements | | ☐ Add | ☐ Edit | ☐ Delete | ☐ Approve | | |
| 320 | Module | | ☐ Add | ☐ Edit | ☐ Delete | ☐ Approve | ☐ Publish | ☐ View |
| 321 | Description | | ☐ Add | ☐ Edit | ☐ Delete | ☐ Approve | | |
| 322 | Attributes | | ☐ Add | ☐ Edit | ☐ Delete | ☐ Approve | | |
| 323 | Related Elements | | ☐ Add | ☐ Edit | ☐ Delete | ☐ Approve | | |
| 330 | Story | | ☐ Add | ☐ Edit | ☐ Delete | ☐ Approve | ☐ Publish | ☐ View |
| 331 | Description | | ☐ Add | ☐ Edit | ☐ Delete | ☐ Approve | | |
| 332 | Attributes | | ☐ Add | ☐ Edit | ☐ Delete | ☐ Approve | | |
| 333 | Modules | | ☐ Add | ☐ Edit | ☐ Delete | ☐ Approve | | |
| 340 | Guide | | ☐ Add | ☐ Edit | ☐ Delete | ☐ Approve | ☐ Publish | ☐ View |
| 341 | Guide Profile | | ☐ Add | ☐ Edit | ☐ Delete | ☐ Approve | | |
| 342 | Related Stories | | ☐ Add | ☐ Edit | ☐ Delete | ☐ Approve | | |
| 343 | Representations | | ☐ Add | ☐ Edit | ☐ Delete | ☐ Approve | | |
| 350 | Glossary Entries | | ☐ Add | ☐ Edit | ☐ Delete | ☐ Approve | ☐ Publish | ☐ View |
| 351 | Pronunciations | | ☐ Add | ☐ Edit | ☐ Delete | ☐ Approve | ☐ Publish | ☐ View |
| 352 | Lookup Lists | | | ☐ Edit | | ☐ Approve | ☐ Publish | ☐ View |
| 353 | Pages | | | ☐ Edit | | ☐ Approve | ☐ Publish | ☐ View |
| 354 | Users | | ☐ Add | ☐ Edit | ☐ Delete | ☐ Approve | ☐ Publish | ☐ View |
| 355 | Roles | | ☐ Add | ☐ Edit | ☐ Delete | ☐ Approve | ☐ Publish | ☐ View |
| 356 | Publishing | | | | | ☐ Approve | ☐ Publish | ☐ View |
| 357 | Checklist | | | ☐ Edit | | | ☐ Publish | ☐ View |

*FIG. 6*

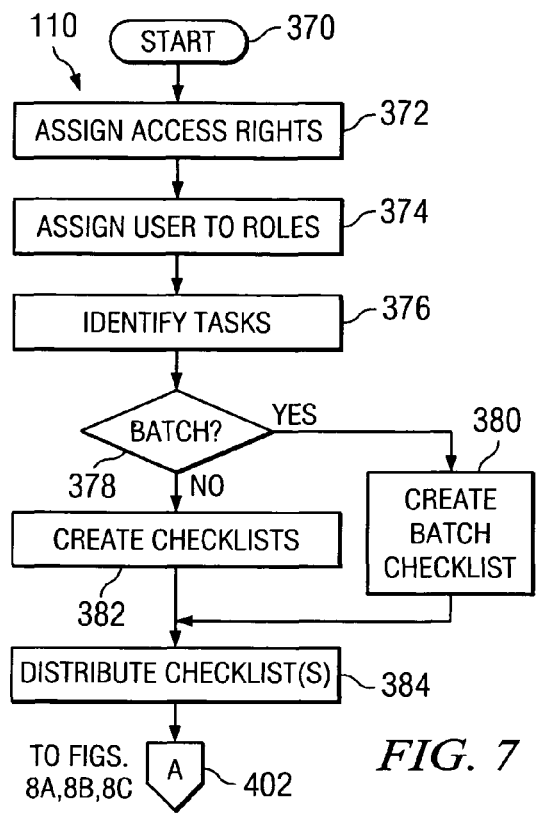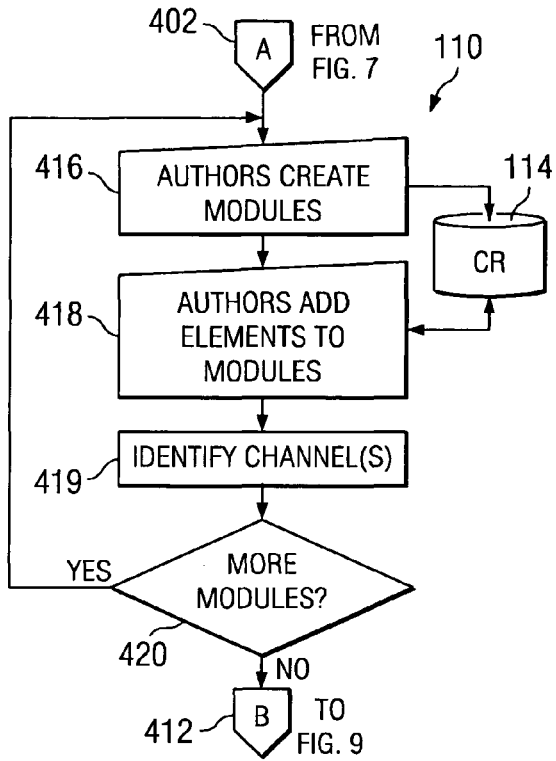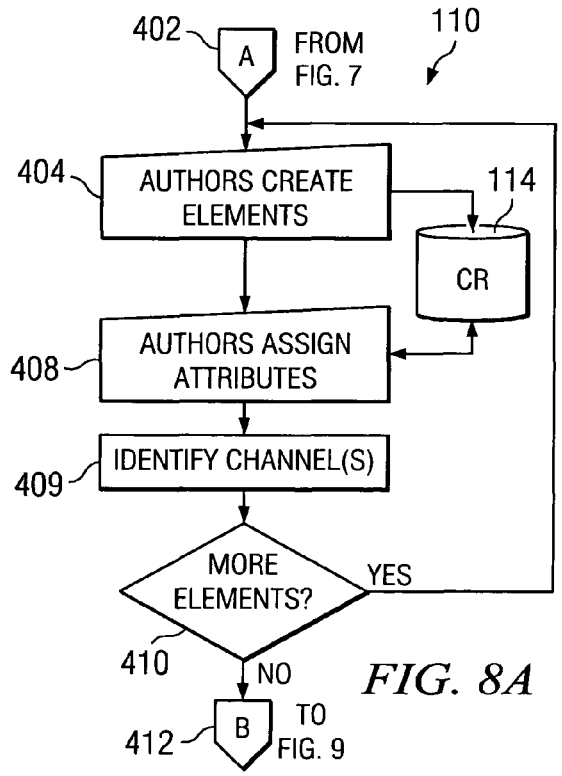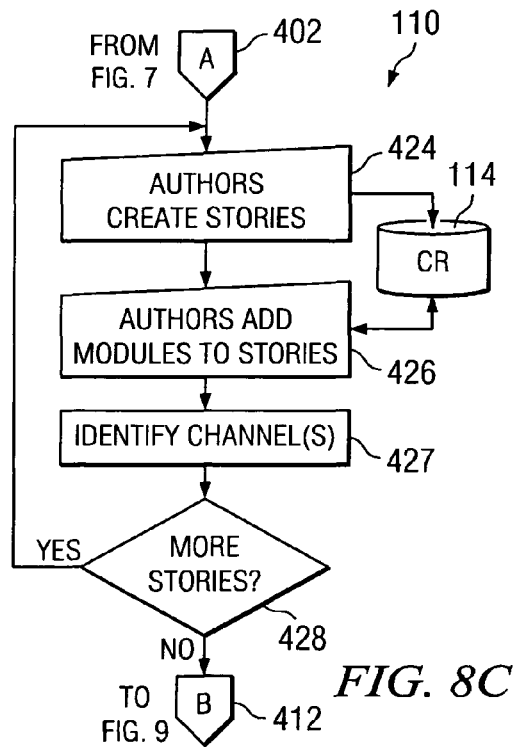
FIG. 7
FIG. 8B
FIG. 8A
FIG. 8C

DIGITAL GUIDE SYSTEM

FIELD OF THE INVENTION

The present invention is related generally to a method and apparatus for assembling and delivering contextual, narrative based content information to an end user and specifically to managing, assembling and delivering the content information to a digital guide device for a guided or self-guided tour of a physical space.

BACKGROUND OF THE INVENTION

Tours are provided of physical spaces containing a number of objects of interest in a number of different situations. Locating objects within the physical space requires adequate directions, information and general guidance on how to go about the tour. The most common tour situations include a tour of a museum, a park or a facility.

Museums contain displays of individual objects. The objects may be displayed individually or they may be grouped together in categories. Information about the objects may be provided in written text positioned near the object. Many objects may have historical characters identified with the object. In addition, the objects may be associated with a location where they were created or found. The amount of information that can be provided on each object is limited by the area available for printed text. The text must be large enough to be read at a distance of several feet, and if text is displayed in more than one language the amount of space available is further reduced.

The problem of providing information beyond text displayed near the object in a museum has been addressed in a number of ways. Publications can be made available ranging from a one page handout to a detailed book with pictures, maps and an index. Audio recordings can be used to provide information. Audio recordings may take the form of speakers that are located near an object or group of objects to provide information about the object or group of objects when activated by a visitor. Another form of audio recording presentation can be provided through a cassette or receiver device given to a visitor who can access the audio through a speaker or a set of headphones connected to the device. In the same manner that audio recording can be provided, audio-visual presentations can be provided either on demand at or near the object, or under the control of the individual visitor through a portable device.

Several problems arise when presenting information in an audio format. Delivering the information in an audio format requires hiring individuals with suitable voices to record the audio presentations from a script. Any changes or updates to the script of the presentation may require obtaining the same individual so that a voice recording of the changed or updated script will match the previous voice recording. Therefore, a problem with current audio tours includes the difficulty of updating the content of the tours. Another problem is that interactivity with the recorded text is limited to selecting from a menu of different recordings. An audio-only tour limits the type of data that can be offered. These limitations may apply even when the audio recording is presented in more than a single channel of delivery such as an audio visual presentation.

An additional way to provide information is through the use of live tour guides. A live tour guide is an individual who is trained, knowledgeable, and available to provide additional information as well as to guide the visitors through the physical location. Live tour guides have at least two distinct advantages. First, a live tour guide may be able to interact with the visitors by asking for questions and providing responses to the questions. Second, and most significantly, a good live tour guide can present information in a compelling narrative context such as a story narrative format. A story narrative format is desirable because such a format greatly increases interest, understanding and retention of the information. However, good tour guides are expensive, the range of information that can be provided by a live tour guide is limited by the experience and education of the tour guide, and human beings are prone to make mistakes so that the quality of each individual presentation can vary.

Another tour situation involves providing a tour of an outdoor location such as national park. For example, visitors to the Gettysburg battlefield in Pennsylvania may view the site from observation points or they may choose to walk to and visit various points on the landscape. In order to enhance the information that can be provided to a visitor at a physical location that is an extended outdoor site, an information provider may not be able to use some of the alternatives that are available in a museum tour. For example, placing signage or placing visitor activated sound sites around the physical location may not be permissible because such signage or sites would spoil the natural appearance of the site. Another example of an outdoor location requiring a tour is a national park such as Yosemite. Any use of automated information must not be intrusive on the natural appearance of the site and therefore, live tour guides are relied upon more than automated information. Tours of outdoor physical locations share the common need to provide information about objects, characters and further locations associated with the objects and characters.

An additional situation arises in providing an orientation tour of a manufacturing facility or an office complex to new employees. A further situation arises in providing educational tours such as a tour of a nuclear power plant. Moreover, safety orientations regarding hazardous locations in areas such as an airport, an oil refinery, or a shipbuilding yard call for touring a physical location and pointing out the specific areas where attention must be paid to possible hazards. Such tours may need to take place while the facility being toured is in operation. Background noise may impede or prevent the use of audio sites or tour guides. Moreover, audio sites or tour guides may interfere with the ongoing operations of the physical locations to be toured. Additionally, the size of the group needing a tour may vary from a single individual to a many individuals.

All of the tours discussed above have common needs. The common needs include locating specific objects within each physical location, providing current and correct information regarding the object, relating the object to an overall physical location, and relating the object to persons associated with the object. In many situations, persons taking tours do not speak the same language and translators are necessary. If information is to be presented in various languages, and translators are not available for live tours, then signage or audio tapes must be translated to make such options available. In addition, a need exists to provide a record of the tour and of the actual information accessed by the person taking the tour.

In order to find a solution to these needs, one may look to patents and existing technology. U.S. Pat. No. 5,819,227 (the '227 patent) to Obuchi discloses a tour schedule processor for processing tour schedules of moving bodies including a vehicle and a pedestrian. In the '227 patent, the tour schedule for the vehicle is located in a data terminal installed in a vehicle and the tour schedule for a driver is stored in a portable data terminal. U.S. Pat. No. 6,529,824 (the '824 patent)

to Obradovich et al. discloses a location tagged data provision and display system using a personal communication device (PCD) having a GPS receiver and a display. A user requests maps and location tagged data from data providers by means of the PCD. The data providers use searching and sorting schemes to interrogate data bases and then transmit responsive data to the PCD. U.S. Pat. No. 6,009,429 (the '429 patent) to Greer et al. discloses a system for guiding a user through a tour of the World Wide Web (WWW) by displaying in sequence actual web pages in the tour along with corresponding teaching web pages. The tour includes "commentary, allowance for side trips, true visiting of the tour pages" and tours where the user clicks for the next page and tours where a timer controls how long a tour page is on-screen. U.S. Pat. No. 6,385,586 (the '586 patent) to Dietz discloses use of a text to voice application in conjunction with a voice to text application in a client server configuration in order to enable language translation devices.

In addition to prior art such as the '227 patent, the '824 patent and the '429 patent, existing technology has expanded the possibilities for assembling and delivering information during tours and for capturing statistical information regarding the tour itself. The technology that has expanded the possibilities for assembly, delivery and capture of information during tours of a physical space includes the Internet, telecommunications, and text-to-speech translation software (such as that disclosed in the '586 patent). These opportunities include the ability to gather data from a multitude of physically disparate locations connected by one or more networks, to provide a vast amount of information limited only by the size of a data base, to transmit this information by the Internet or by wireless communications, and to translate text based information into any language using text to speech translation software. These opportunities include the ability to provide tours independent of the need for live tour guides or voice talent for audio presentations. However, in order to capitalize on these opportunities, and in order to effectively exploit these opportunities, a need exists for a method and apparatus to assemble disparate information in a story narrative format and to deliver the information by text, audio, animation or visual means to a user where the user can interact with either the full data base or an extracted portion of the data base.

SUMMARY OF THE INVENTION

The invention that meets the needs described above is a Digital Guide System (DGS) that assembles and delivers contextual, narrative content information to an end-user requiring a guided or self-guided tour of a physical space. DGS consists of a Content Management System application (CMS), a Channel Administration application (CA), a Content Repository (CR) and a Channel Device application (CDA). CMS is a web-based application for assembling multi-media content information. CMS allows developers to build content information in discrete narratives using a modular story-building methodology. CMS allows a user to assign access rights and to specify roles based upon groupings of the assigned access rights. The access rights assigned to each of the roles govern the developing, editing, approving, translating and publishing of the content information. Exemplary roles include author, translator, editor, approver, content manager, and system administrator. Using the modular story-based methodology, authors build narrative content from discrete elements. Elements include objects, places, and characters. The CMS stores all information relevant to editorial control and content development in the CR. A text-to-speech application (TTS) converts text-based content into audio content. TTS may be implemented as part of either the CMS or the CA. The CA is a browser-based registration and device management application. The CA delivers content information to devices in channels designated for that content information by the CMS. The CA further collects and graphs user demographics and statistics and creates a personalized summary of the use of the digital guide device that can be printed and/or e-mailed to the end-user. The CDA allows the user to navigate through the content information using the modular story based organization and collects usage information in a user log for transmittal to the CA.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a graphical user interface for assigning right within the CMS;

FIG. 7 depicts a partial flow chart of the CMS process;

FIG. 8A depicts a partial flow chart of the CMS process;

FIG. 8B depicts a partial flow chart of the CMS process;

FIG. 8C depicts a partial flow chart of the CMS process;

DETAILED DESCRIPTION OF THE PREFERRED EMBODIMENT

As used herein, the term "access right(s)" shall mean one or more of the following rights assigned to an individual so that the individual can complete tasks within a Content Management System application (CMS): add, edit, delete, approve, publish and/or view.

As used herein, the term "attribute" shall mean, a basic item of content information created by a content manager, and available for use by an author in creating an element.

As used herein, the term "channel" shall mean a medium for carrying content information in digital form and presenting the content information in an audio, visual or audio visual display.

As used herein, the term "channel administration application" shall mean (1) a program for delivering content information to a channel device application where the channel device application has been assigned to the content information by a content management system, and/or (2) a program for collecting user demographics, generating statistical data from a user log and creating a personalized summary report.

As used herein, the term "channel device application" shall mean any program that (1) collects usage information from a channel device user log for direct or subsequent transmission to a channel administration application and/or (2) provides a means for navigating content information at a channel device.

As used herein, the term "computer" shall mean a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, the term "content information" shall mean text, audio and/or visual data created, edited, assembled, approved and published in accordance with access rights granted within a content management system application.

As used herein, the term "content management system application" shall mean a program that manages the production of content information by assigning rights, assembling content information in elements, modules and stories, assigning channels to the content information and, when requested, providing content information to a channel administration application for distribution to a channel device application.

As used herein, the term "representation" shall mean a textual, visual, or animated depiction of an object, character or location.

As used herein, the term "role(s)" shall mean a name given to a grouping of access rights by a content management system application (CMS).

As used herein, the term "user log" shall mean data indicating the movement and selections of a user of a channel device application.

Digital Guide System

Figure 1:
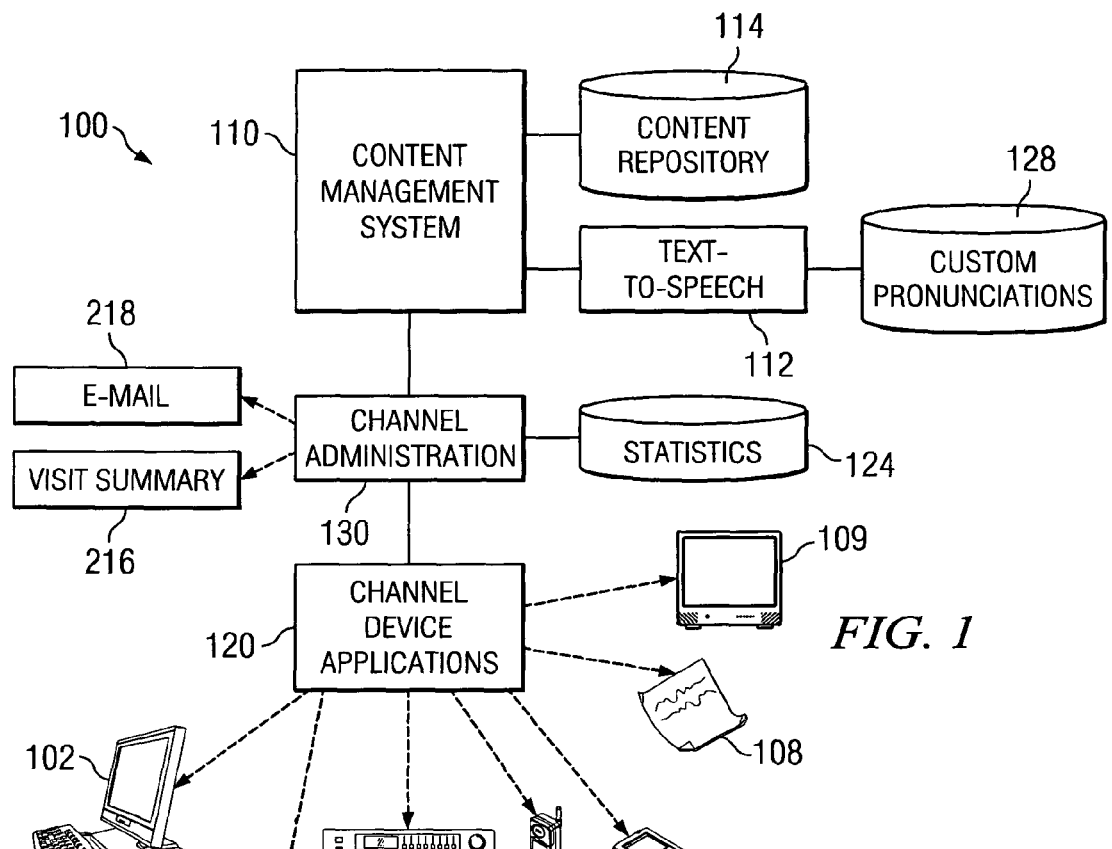
FIG. 1 depicts the digital guide system configuration.

FIG. 1 depicts an overview of digital guide system (DGS) 100. DGS 100 has Content Management System application (CMS) 110, Channel Administration application (CA) 130, and one or more Channel Device applications (CDA) 120. CMS 110 is connected to Content Repository (CR) 114 and to CA 130. Text-to-Speech (TTS) application 112 is connected to CMS 114 and to Custom Pronunciation database (CP) 128. CA 130 delivers e-mail 218 and/or printed visit summary 216 for a user of CA 130. CA 130 is connected to CMS 110 and CDA 120. CDA 120 may deliver content information to any number of channel types. First channel type 108 is printed matter. Second channel type 109 is a television. Third channel type 107 is a hand held display device. Fourth channel type is a cell phone 106. Fifth channel type 105 is an audio receiver. Sixth channel type 104 is a tablet computer. Seventh channel type 102 is a computer with display. Channel types shown in FIG. 1 are by way of example only and persons skilled in the art are aware of additional devices by which content information may be experienced. CA 130 also receives data from channel applications 120 and sends the data to statistics data base 124 and/or sends an e-mail and/or printout with a visit summary to a user. CMS 110 may be a browser-based Websphere® application and CR 114 may be DB2®. Persons skilled in the art are aware of multiple ways of connecting DGS 100 components. For example, DGS components may be connected by a network with CMS 110 and CA 130 residing in a one or more server computers (not shown) and CDA 120 residing in one or more client computers (not shown). Likewise, CR 114, TTS 112, and CP 128 may be connected to CMS 110 by a network. Statistics database 124 may be connected to CA 130 by a network. In the preferred embodiment, the network is the Internet.

Figure 2:
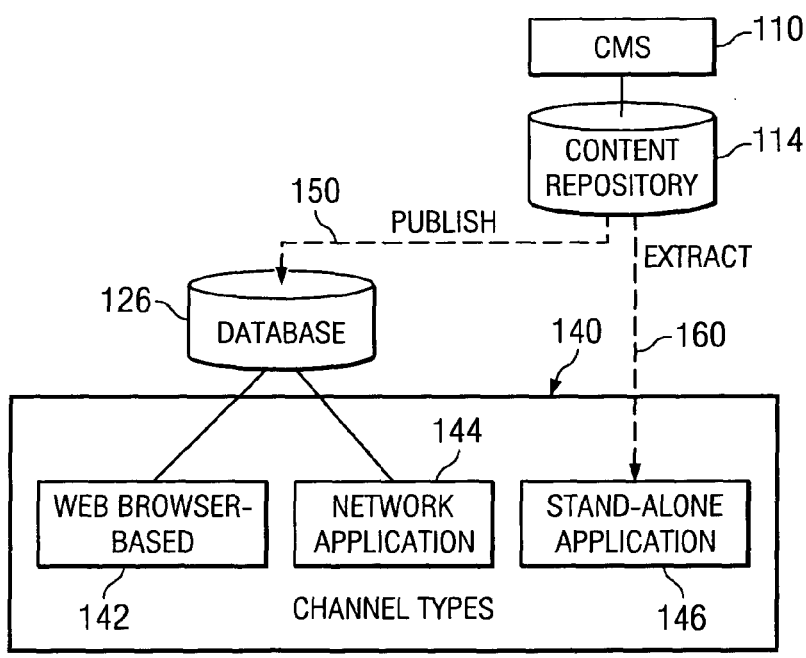
FIG. 2 depicts the delivery of content to different channel type groups.

FIG. 2 depicts multi channel configuration of DGS 100. CMS 110 is connected to CR 114. Content information from CR 114 may be published (150) to database 126 or extracted (160) to stand alone application 146. Content information from database 126 may be displayed on a web based browser 142 or a network application 144. In DGS 100 content information may be presented to an end-user through a variety of channel applications and on a variety of channel devices. Channel types 140 may be generally placed into groups such as web browser-based 142, network application 144, or stand alone application 146. Channels may be mobile or stationary, electronic or printed, online or offline (stand alone). A stand-alone channel device generally has no persistent connection to the CR. Instead, an extract of content information is loaded into the stand-alone channel device before use (160). The extract of content information loaded into the stand alone application is extracted from CR 114 and therefore, stand alone application 146 does not have access to the complete content information in CR 114 or in database 126. DGS 100 may also deliver content information in a variety of modes, including text, images, audio, and animation or any combination thereof.

Figure 3:
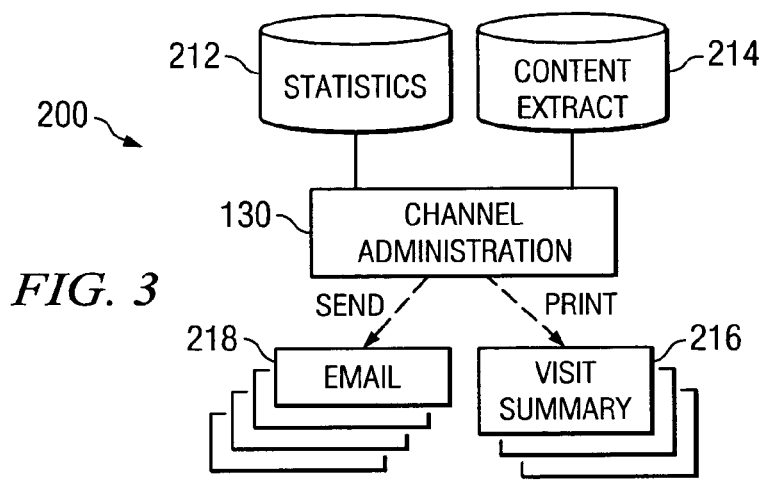
FIG. 3 depicts the input and output of the CA for a stand alone application.

FIG. 3 depicts one configuration of CA 130 for a stand alone channel device application (such as stand-alone application 146 in FIG. 2). CA 130 may be connected to a content extract database 214. CA 130 compiles usage statistics for stand alone channel application 146 and sends usage information by e-mail 218 or prints summary 216. CA 130 may have a separate database for stand alone application statistics such as statistics database 212.

Figure 4:
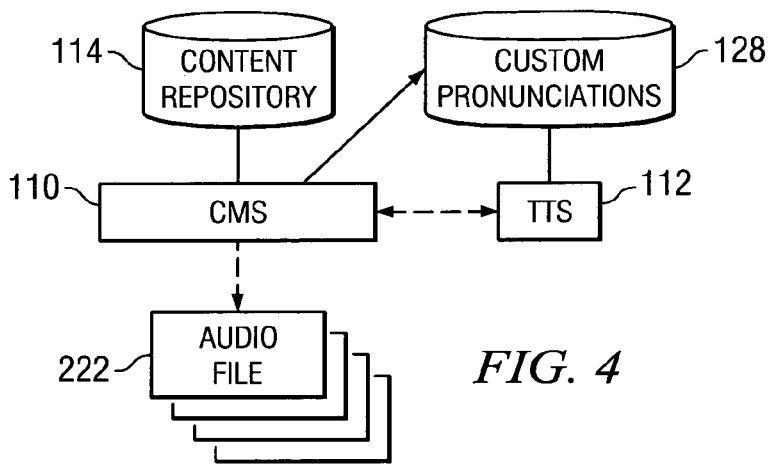
FIG. 4 depicts the creation of custom pronunciations and audio files by the CMS.

FIG. 4 depicts CMS 110 configured to convert text from CR 114 into a plurality of audio files 222 using text to speech application 112 and custom pronunciation database 128.

Content Management System Application

Figure 5A:
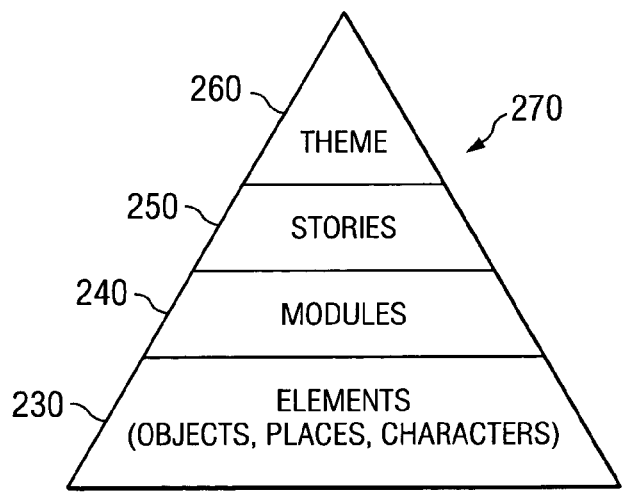
FIG. 5A depicts the organizational hierarchy of content information.

FIG. 5A depicts an overview of the manner in which DGS 100 content information 270 is organized and assembled.

Content information 270 is organized in a hierarchy with elements 230 organized into modules 240. Modules 240 are organized into stories 250. Stories 250 are organized into themes 260.

Figure 5B:
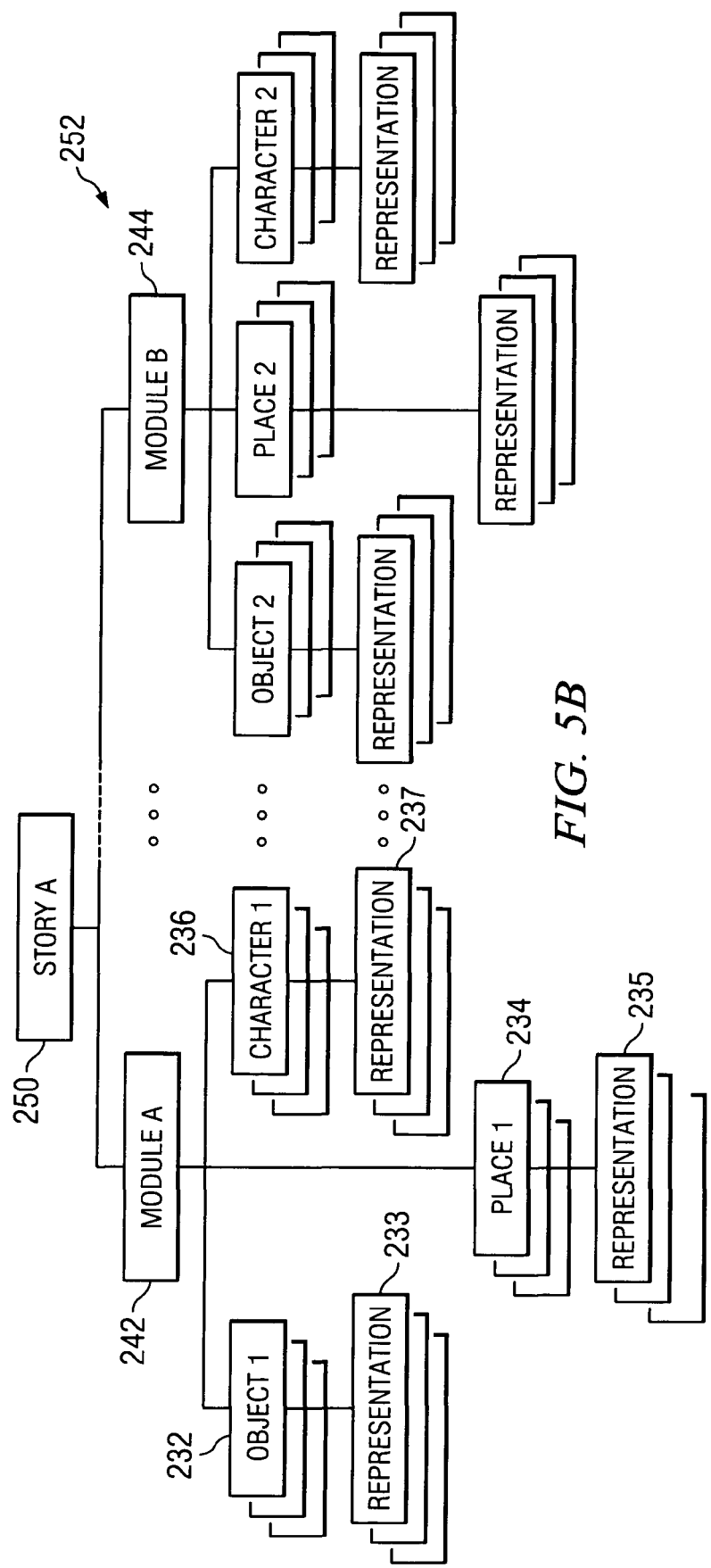
FIG. 5B depicts the organization of an exemplary first story.
Figure 5C:
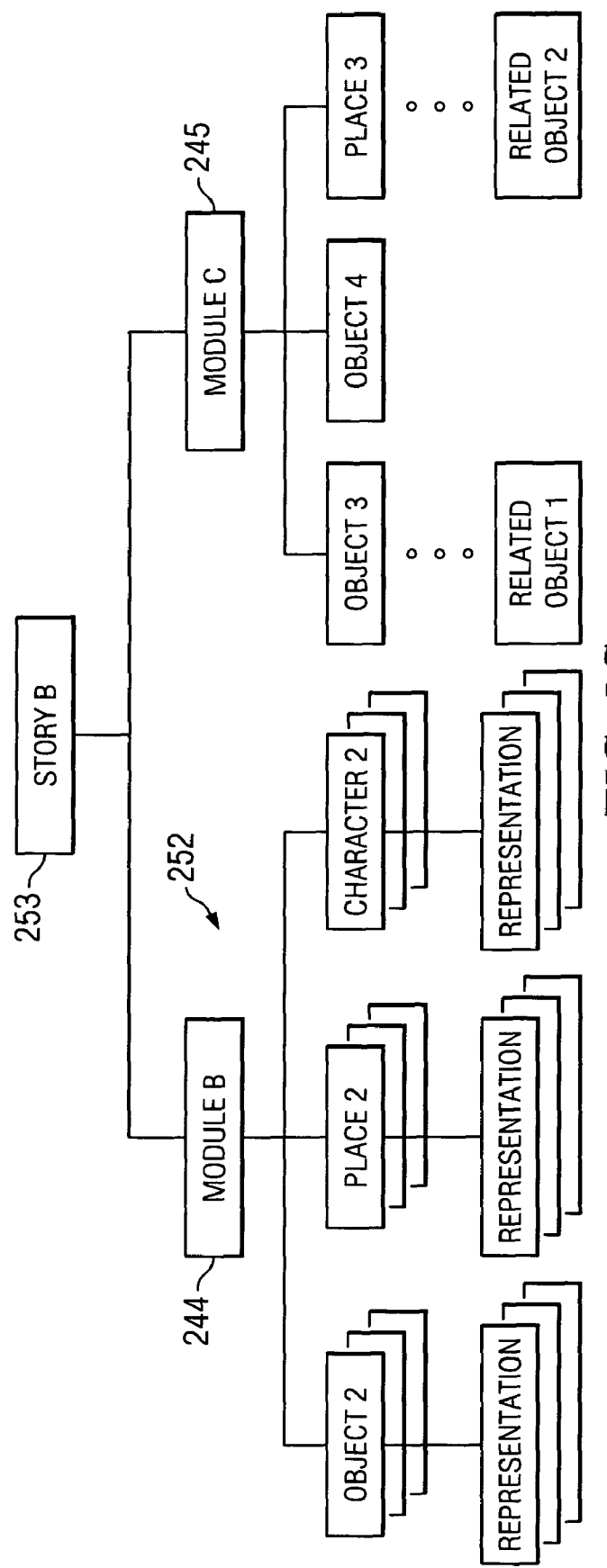
FIG. 5C depicts the organization of an exemplary second story.

FIG. 5B depicts story 252 having module A 242 and module B 244 (also referred to as common module 252, see FIG. 5C). Module A 242 has a plurality of objects such as object 232, a plurality of places such as place 234 and a plurality of characters such as character 236. Each object 232 has a representation 233. Each place 234 has a representation 235. Each character 236 has a representation 237.

FIGS. 5A, 5B and 5C depict the organizational hierarchy for content information that allows DGS 100 to meet the needs of locating specific objects within a physical location, providing current and correct content information regarding the object, relating the object to the physical location, and relating the object to persons associated with the object. Specifically, content information is built from basic elements. An object that is to be viewed such as a statue in a museum may be related to another element regarding a character such as the person who made the statue. Additionally, the object may be linked to an element regarding the location where the statue was created. A representation may be associated with each element such as a picture of the statue, a picture of the artist who created the statue and a picture of the building in which the statue was created. In addition, the representation could be an animation or motion picture segment. All content information in DGS 100 will be assembled, delivered and navigated primarily based upon these hierarchial relationships.

FIGS. 5B and 5C depict an example of how elements may be combined in multiple ways to form modules and stories. FIG. 5A depicts story A 250 having Module A 242 and Module B 244. FIG. 5C depicts story B 253 having Module B 244 and Module C 245. Story A 250 and Story B 253 have common Module 252, specifically Module B 244. Module C 245 of Story B 253 has elements linked to related elements. Specifically, object 3 is linked to related object 1 (also in module A 242) and place 3 is linked to related object 2 (also in Module B 244).

FIG. 6 depicts an exemplary graphical user interface (GUI) 300 for assigning access rights within CMS 110. Access rights may include one or more of the following: add, edit, delete, approve, publish and/or view. Once a group of access rights has been assigned, a role name may be provided to define the group of access rights. The role name assigned to a group of access rights may be entered in window 302. Typical roles include approver, system administrator, translator, editor, content manager and author. An approver may give final approval before original narrative content is published. A system administrator may be responsible for establishing publishing queues, assigning users to roles, granting necessary access rights to roles, and general CMS maintenance. A translator makes approved narrative content available in multiple languages. A content manager is responsible for providing attributes to authors. As defined above, these attributes are basic items of content information and the reason that a role is assigned for these tasks is to insure accuracy and consistency in the development of elements by persons with different access rights and tasks. For example, there may be more than one date estimated for the creation of an object. In such a case a role such as content manager having the appropriate access rights would make the decision as to which date would be used and such a date would become an attribute. Thus, if different authors were creating elements and modules that require mention of the date of discovery, each author would use the same date and the resulting information content would be consistent. Another example of an attribute may be a description of the material from which an object is made. Once again, different authors may have different opinions regarding the material. However, the content manager would make a decision as to the description of the material to be entered into the system as an attribute. Thereafter, every reference to that particular material would be based upon the attribute and thus consistent throughout the entire modular narrative story building process. Related attributes may be assembled in lookup lists for access by authors. An editor may be responsible for reviewing original narrative content for formal and substantive defects. An author may develop original narrative content.

The assignment of access rights is the primary way in which CMS 110 manages content development. For example, only a user with appropriate access rights may complete a task delegated to that role. Therefore, a system manager may create a checklist enumerating all tasks that a user in a particular role must complete before content information can be published in the digital guide system. Normally, checklists would be available only to the roles that the items apply to, but the system manager may also batch items into one checklist and distribute them system-wide. More than one user can be assigned to a role. For example, multiple authors can work concurrently to contribute content. CMS 110 may automatically notify other users as tasks are completed. Likewise, CMS 110 may track the progress in a publishing queue. When all users have completed all tasks, the content is finalized and a time for publication is established. Changes may be validated by reviewing published content on a website.

GUI 300 allows the following to be assigned to a particular user. First, languages 304 may be assigned. By way of example, checkboxes for English, French, Arabic and Arabic vowelized are shown. The remainder of GUI 300 is devoted to assigning access rights 306. Elements 310, Modules 320 and Story 330 may be assigned the right to Add 360, Edit 361, Delete 362, Approve 363, Publish 364 and View 365. The Elements subcategories which are Description 312, Attributes 313, Dates 314, Bibliographies 315, Representations 316 and Related Elements 317 may be assigned the right to Add 360, Edit 361, Delete 362 and Approve 363. The Module subcategories which are Description 321, Attributes 322 and Related Elements 323 may be assigned the right to Add 360, Edit 361, Delete 362 and Approve 363. The Story subcategories which are Description 331, Attributes 332 and Modules 333 may be assigned the right to Add 360, Edit 361, Delete 362 and Approve 363. Exemplary GUI 300 further has Guide 340, Glossary Entries 350, Pronunciations 351, Users 354, Roles 355 may be assigned the right to Add 360, Edit 361, Delete 362, Approve 363, Publish 364 and View 365. Guide Profile 341, Related Stories 342, and Representations 343 may be assigned the right to Add 360, Edit 361, Delete 362 and Approve 363. Lookup Lists 352, Pages 353 may be assigned the right to Edit 361, Approve 363, Publish 364 and View 365. Publishing 356 may be assigned the right to Approve 363, Publish 364 and View 365. Checklist 357 may be assigned the right to Edit 361, Publish 364 and View 365.

Guide 340 refers to a representation of a person to act as a guide while a user is taking a tour using a channel device application. Lookup list(s) 352 refers to establishing lists of related attributes. For example, a user assigned to add an attribute would go to a lookup list to find a listing of attributes for a subject and choose from an attribute from the lookup list. Persons skilled in the art will recognize that GUI 300 is by way of example, and that many different graphical user interfaces could be created with different access rights to be assigned using the concepts disclosed in GUI 300.

FIGS. 7, 8A, 8B, 8C and 9 depict a flow chart of CMS 110. CMS 110 assembles information 270 for placement into CR 114. CMS 110 starts (370) and access rights are assigned (372). A user is assigned to a role (374) and tasks are identified to be accomplished (376). A determination is made as to whether the user wants to batch tasks (378). If tasks are to be batched, then a batch checklist is prepared (380). If tasks are not to be batched, then checklists are prepared (382). Checklists are distributed (384).

FIGS. 8A, 8B, and 8C depict alternative points for CMS 110 to link with FIG. 7 (402). Referring to FIG. 8A, CMS 110 continues from step 384 and authors create elements (404). As discussed in FIGS. 5 and 6, an element may be a place, a character or an object and the element is given a representation, such as an image or animation, and a text description. An object element may also be assigned a pervasive identifier. A pervasive identifier is a number associated with the physical object that an object element represents. A pervasive identifier is usually displayed with or near a physical object when the physical object is displayed publicly in the physical location that is the subject of a tour. The authors may assign attributes to the elements (408). Attributes for each element are selected. One or more channels are identified for each element and attribute (409). A determination is made as to whether more elements are to be created (410). If so, CMS 110 returns to 402. If not, CMS 110 goes to step 430 (see FIG. 9).

Referring to FIG. 8B, CMS 110 continues from step 384 and authors create modules (416). A module is created by associating a first element to a second element by designating the second element as a related element. The related elements are organized into modules. The authors may add elements to the module (418). One or more channels are identified for the module (419). A determination is made as to whether more modules are to be created (420). If more modules are to be created, CMS 110 goes to step 418. If not, CMS 110 goes to step 430 (see FIG. 9). Referring to FIG. 8C, CMS 110 continues from step 384 with authors creating stories (424). Authors may add modules to the stories (426). One or more channels are identified for the stories (427). A determination is made as to whether more stories are to be created (428). If more stories are to be added, CMS 110 goes to step 426. If more stories are not be added, CMS 110 goes to step 430. As discussed in FIG. 8B, groups of related elements can be formed into modules. Likewise, groups of related modules can be formed into stories. The procedure to create a story is the same as for modules and requires a module to be designated as related to another module. A story can be designated as being related to another story. Groups of related stories may be organized into themes. In FIG. 8A, 8B and 8C the respective created elements, modules and stories are placed in CR 114 and the respective added attributes, elements and modules may be drawn from CR 114.

Figure 9:
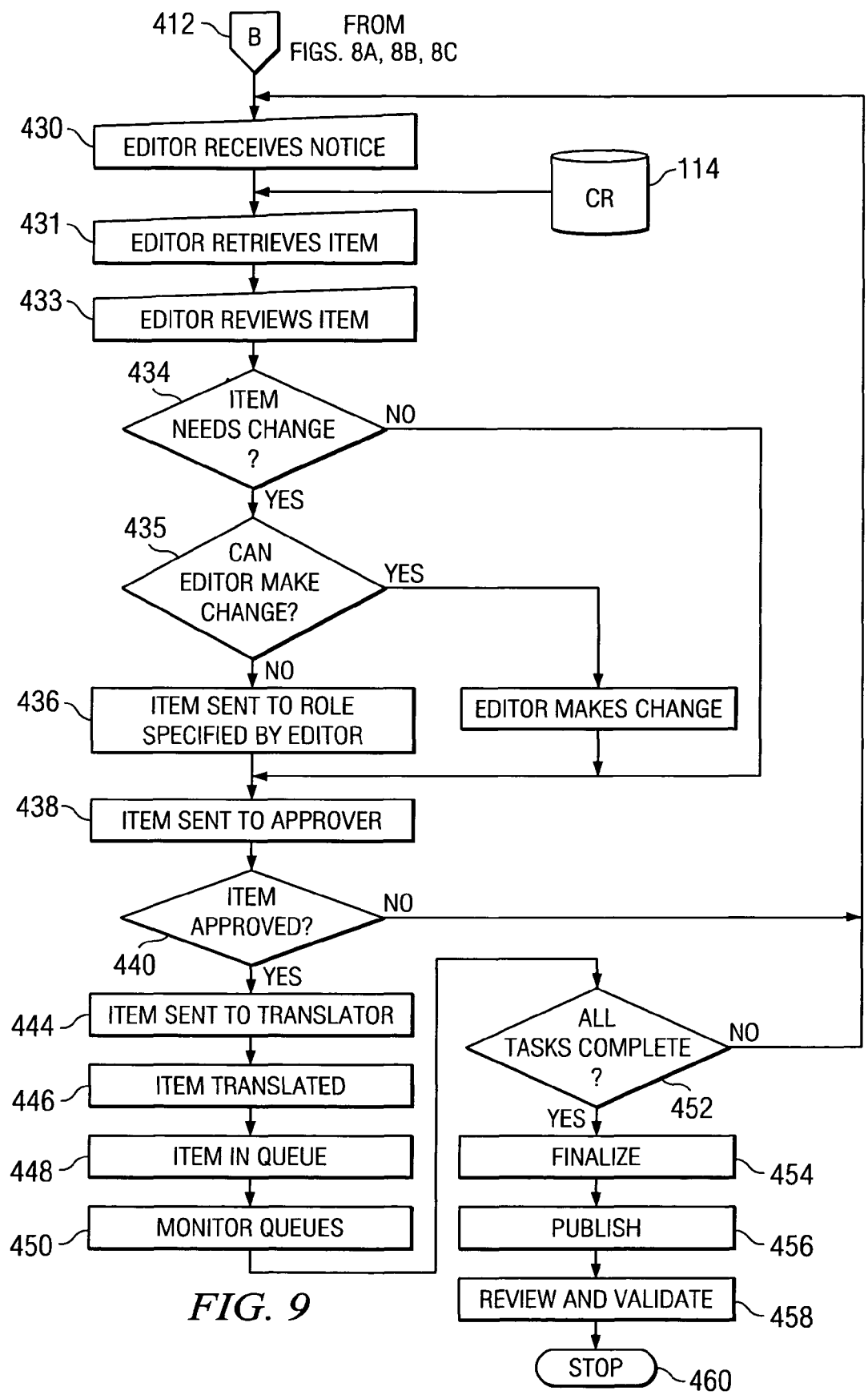
FIG. 9 depicts a partial flow chart of the CMS process.

Referring to FIG. 9, the editor receives notice of an item (element, module; or story) sent to CR 114 by an author (430). The editor retrieves the item (432) and reviews the item (433). A determination is made as to whether the item needs to be changed (434). If the item needs to be changed, a determination is made as to whether the editor can make the change (435). If the editor can make the change, the editor makes the change and CMS 110 goes to step 438. If the editor cannot make the change, the item is sent to a role specified by the editor (436). If the item does not need to be changed, the item is sent to the approver (438). A determination is made as to whether the item is approved (440). If the item is not approved, CMS 110 goes to step 430. If the item is approved, the item is sent to the translator (444). The item is translated (446). The item is placed in queue for publishing (448). The system administrator monitors the queues (450). A determination is made as to whether all tasks are completed (452). If all tasks are not completed, CMS 110 goes to step 430. If all tasks are completed, the content is finalized (454). The content is published (456). The published content is reviewed and validated (458) and CMS 110 stops (460). Each element, module, story, and theme stored in CR 114 (See FIG. 1) has a unique numerical identifier.

Channel Device Application(s)

Channel Device Application (CDA) 120 (see FIG. 1) is a group of programs that allow the user to navigate through the content information using the modular story based organization, collect usage information in a user log for transmittal to the CA, and generate statistics and a personalized summary report of the usage of a channel device. CDA 120 has a first program, a second program and a third program.

Figure 10:
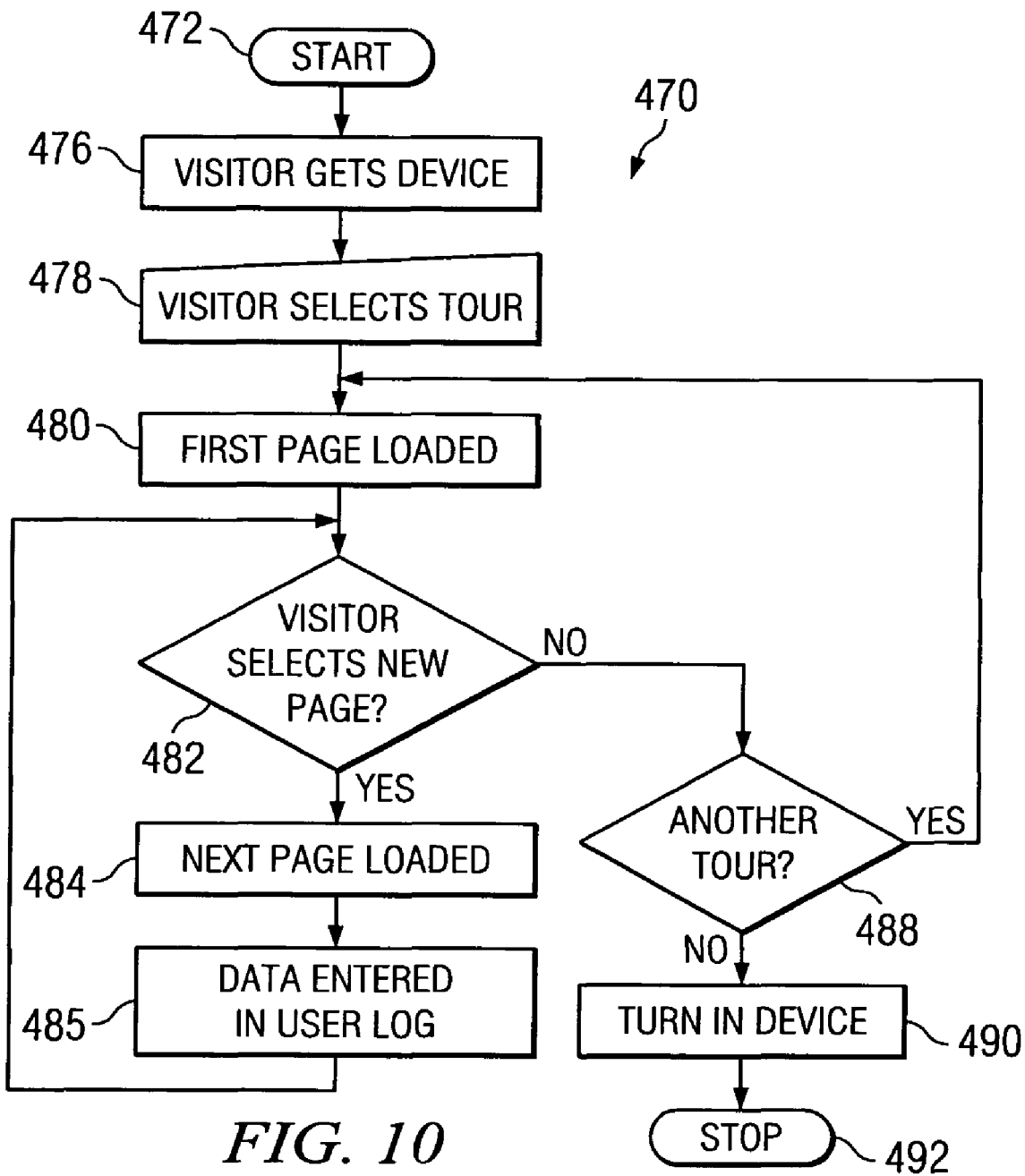
FIG. 10 depicts a flow chart of a user process for a stand alone channel device application.

FIG. 10 depicts Channel Device Application first program (CDA1) 470. CDA1 470 starts (472) and the visitor gets a device (476). The visitor selects a tour (478). The visitor selects a tour (478). The first page of the device is loaded (480). A determination is made as to whether the visitor has selected a new page (482). If not, CDA1492 stops. If the visitor has selected a new page, the next page is loaded into the device (484). CDA1 470 data is entered into a user log in the device (485). If at step 482, the visitor does not select a new page, a determination is made as to whether the visitor wants to take another tour (488). If the visitor wants to take another tour, CDA1 470 returns to step 482. If another tour is not to be taken, the device is turned in (490) and CDA1 470 stops.

Figure 11:
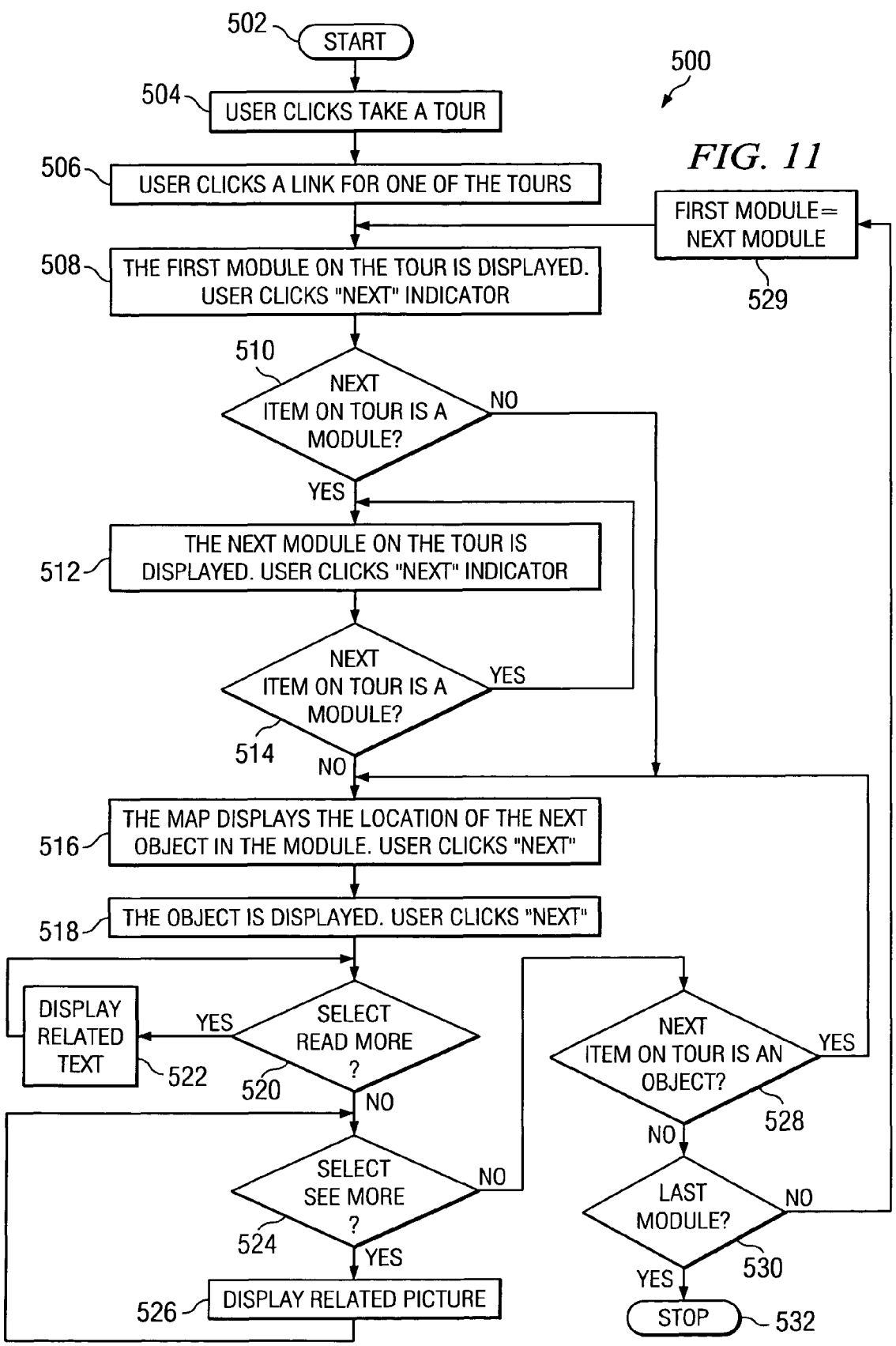
FIG. 11 depicts a flow chart of a channel device application first process.

FIG. 11 depicts a flow chart of CDA second program (CDA2) 500. CDA2 500 starts (502) and the user clicks "take a tour" (504). The user then clicks a link for one of the available tours (506). DGT 500 displays the first module on the tour and the user clicks the next indicator (508). A determination is made as to whether the next item on the tour is a module (510). If the next item on the tour is a module, CDA2 500 goes to step 512. If the next item is not a module, the map displays the location of the next object in the module and the user clicks "next" (516). The object is displayed and the user clicks "next" (518). A determination is made as to whether the user has selected "Read More" (520). If the user selected "Read More," then related text is displayed and CDA2 500 goes to step 520. If the user has not selected "Read More," then a determination is made as to whether the user has selected "See More" (524). If the user has selected "See More," then a related picture is displayed (526). If the user has not selected "See More," then a determination is made as to whether the text item on the tour is an object (528). If the next item on the tour is an object, CDA2 500 goes to step 516. If the next item on the tour is not an object, a determination is made as to whether the last module has been displayed (530). If the last module has not been displayed, first module is set equal to next module (529) and CDA2 500 goes to step 508. If the last module has been displayed, CDA2 500 stops (532).

Figure 12A:
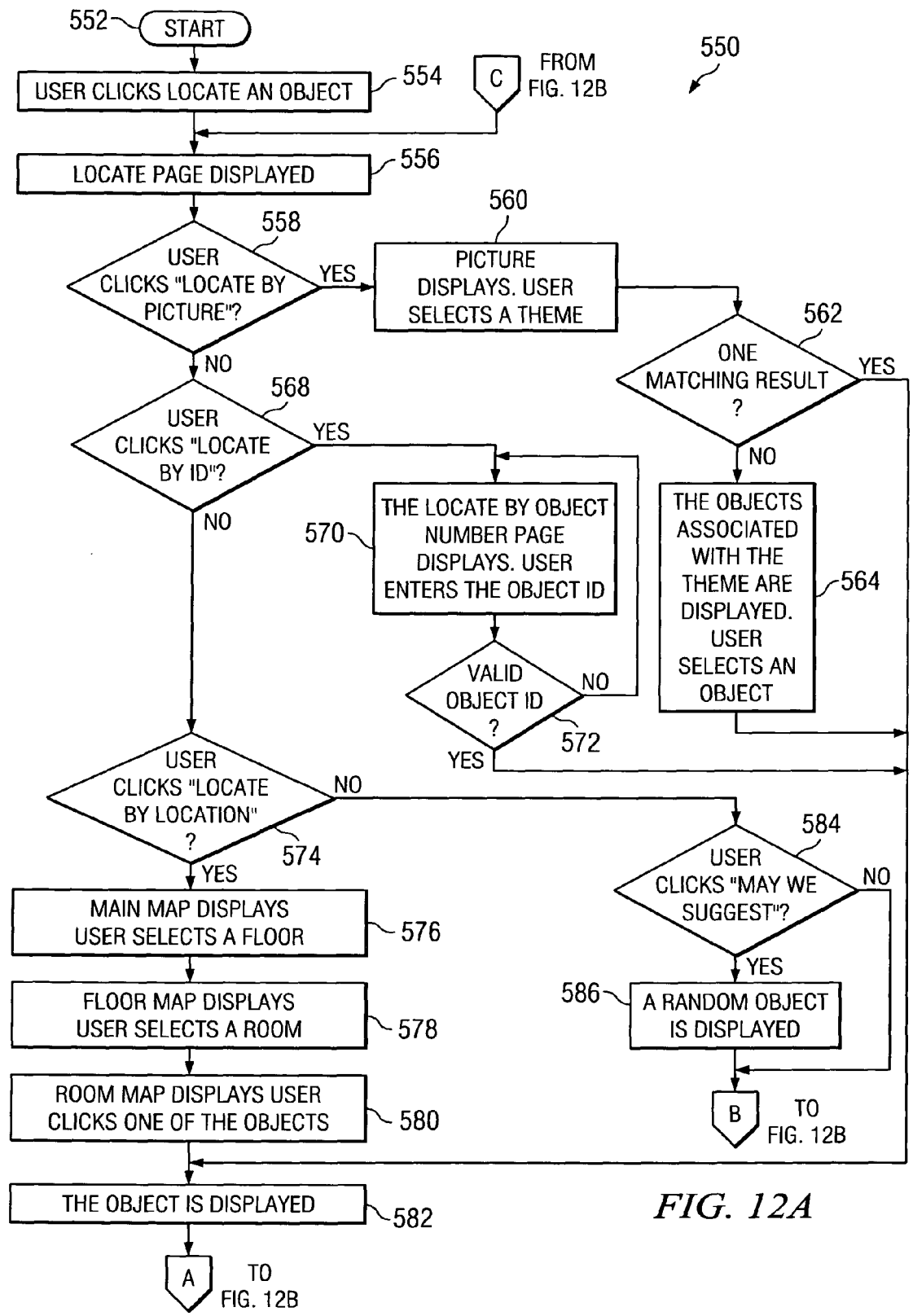
FIG. 12A depicts a partial flow chart of a channel device application second process.

FIG. 12A depicts a flow chart for Channel Device third program CD3 550. CDA3 550 starts (552) and the user clicks "locate an object" (554). The locate page is displayed (556). A determination is made as to whether the user clicked "locate by picture" (558). If the user clicked "locate by picture" then the picture is displayed and the user selects a picture (560). A determination is made whether there is one matching result (562). If there is one matching result, DGL 550 goes to step 582. If there is not a matching result, the objects associated with the picture are displayed, the user selects an object (564) and CDA3 550 goes to step 582.

If at step 558, the user did not click "locate by picture", then a determination is made whether the user clicked "locate by ID" (568). If the user clicked "located by ID," then a "locate by object number" page displays and the user enters the object ID (570). A determination is made as to whether the object ID is valid (572). If the object ID is not valid, DGL 550 returns to step 570. If the object ID is valid, CDA3 550 goes to step 582. If at step 568 the user did not click "locate by ID," then a determination is made as to whether the user clicked "locate by location" (574). If the user did not click "locate by location", then a determination is made as to whether the user clicked "may we suggest" (584). If the user clicked "may we suggest," then a random object is displayed (586) and DGL 550 goes to step 592 (See FIG. 12B). If the user did not click "may we suggest," then CDA3 550 goes to step 592.

If at step 574 the user clicked "locate by location," then a main map is displayed with objects numbered and the user selects a floor (576). The floor map displays and the user selects a room (578). A room map displays with objects numbered and the user clicks one of the objects (580). The object is displayed (582).

Figure 12B:
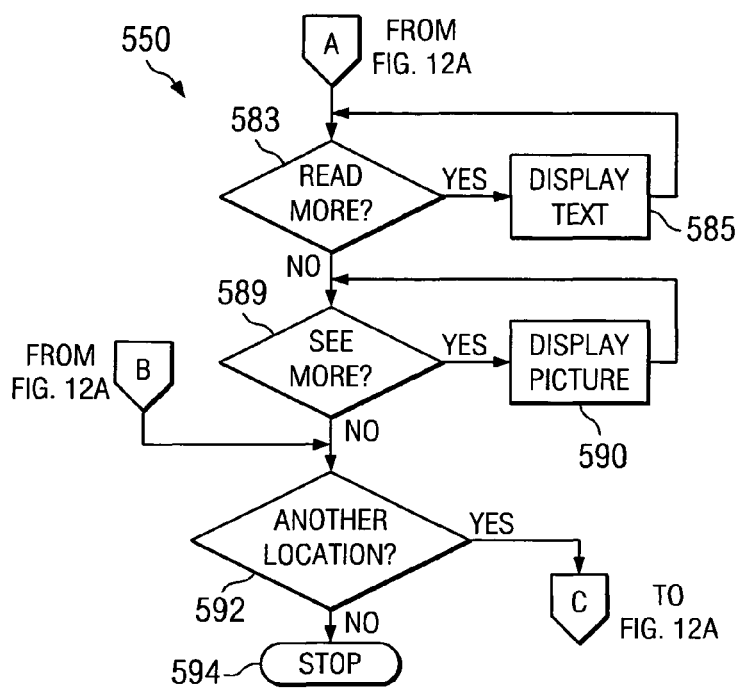
FIG. 12B depicts a partial flow chart of the channel device application second process.

Referring to FIG. 12B, a determination is made as to whether the user has selected "Read More" (583). If the user selected "Read More," then text is displayed (585) and CDA3 550 goes to step 583. If the user did not select "Read More," then a determination is made as to whether the user has selected "See More" (589). If the user has selected "See More," then a picture is displayed (590). If the user did not select "See More," then a determination is made as to whether there is another location (592). If there is another location, CDA3 550 goes to step 556 (see FIG. 12A). If there is not another location, CDA3 550 stops (594).

Channel Device

As further discussed above in FIG. 2, DGS 100 can be employed to deliver content information in different types of channels including without limitation a web browser-based application 142, a network application 144 and a stand alone application 146. Examples of these types of channels, as discussed in FIG. 1, are printed matter, a television, a hand held display device, a cell phone, an audio receiver, a tablet computer, and a computer with display. The advantages of delivering content assembled using CMS 112 can be seen by illustrating use of a digital device to access the content. For purposes of illustration, FIGS. 13 through 23 depict stand alone channel device application (SACDA) 600. SACDA 600 is not connected to a network and contains an extract of content information in a memory of SACDA 600. Other channel devices may be connected to the published database and/or CR by the Internet or a network, and have access to a full content information rather than an extract. Other than the extract of content information, SACDA functions in the same manner as the other channel devices for implementation of CDA 120.

Figure 13:
FIG. 13 depicts a channel device application language selection display.
Figure 14:
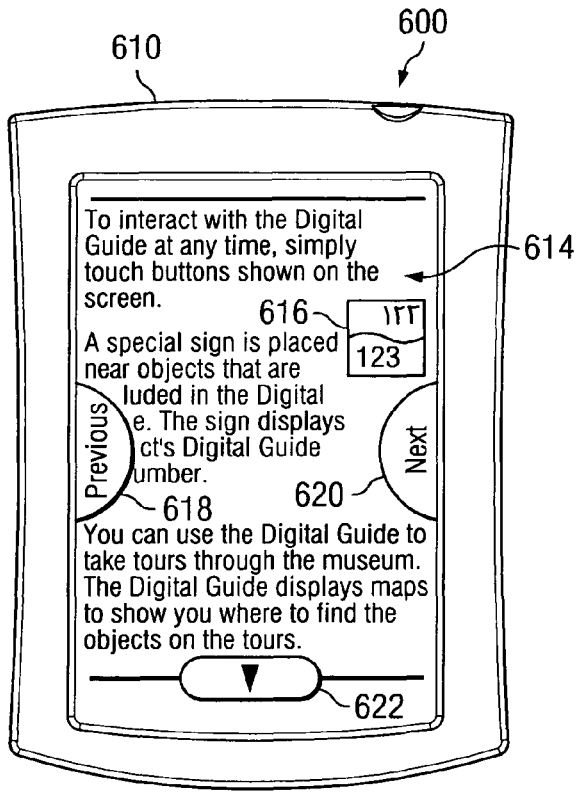
FIG. 14 depicts a channel device application instruction display.

FIG. 13 depicts SACDA 600 having case 610 and display 614. Display 614 provides the user with a select a language menu with English, French or Arabic. FIG. 14 depicts SACDA 600 showing display 614, previous button 618, next button 620 and scroll button 622. Display 614 shows instructions displayed and a representation of a sign (616) that is placed by objects in the museum. For example, representation 616 shows a sign for object 123. Scroll button 622 allows the user to scroll down the display.

Figure 15:
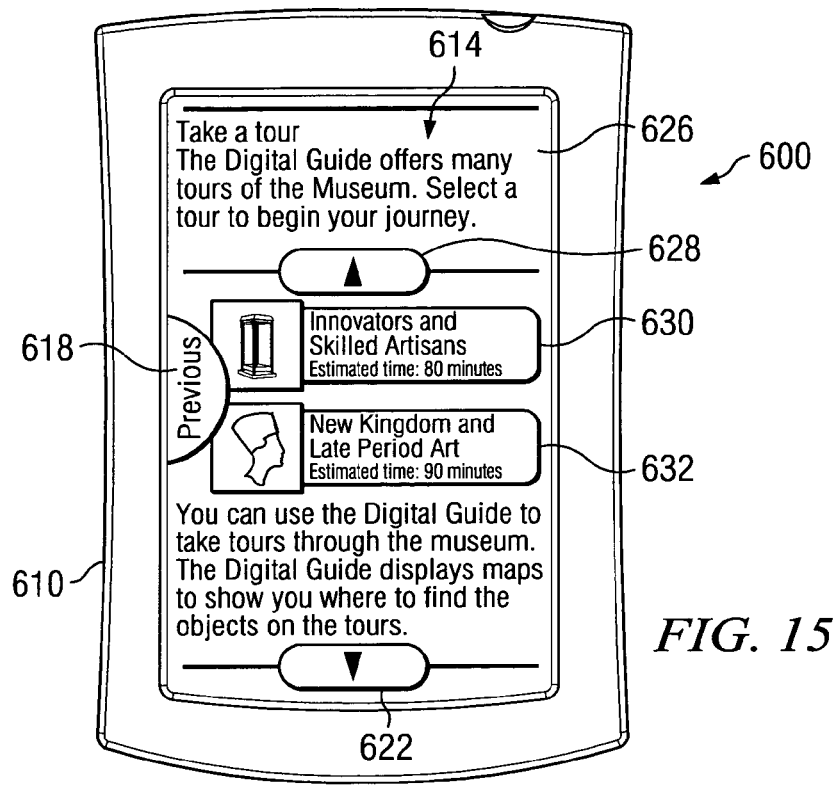
FIG. 15 depicts a channel device application tour selection display.

FIG. 15 depicts SACDA 600 with display 614 showing "select a tour" display 626. Additional scroll button 628 allows the user to scroll up. In display 626 the user is presented with two tour choices. The first choice is for a tour entitled "Innovators and Skilled Artisans" 630. The second choice is for a tour entitled "New Kingdom and Late Period Art" 632. By way of example, FIG. 16 and FIG. 17 will show a user making subsequent selections after having clicked on "Innovators and Skilled Artisans" 630.

Figure 16:
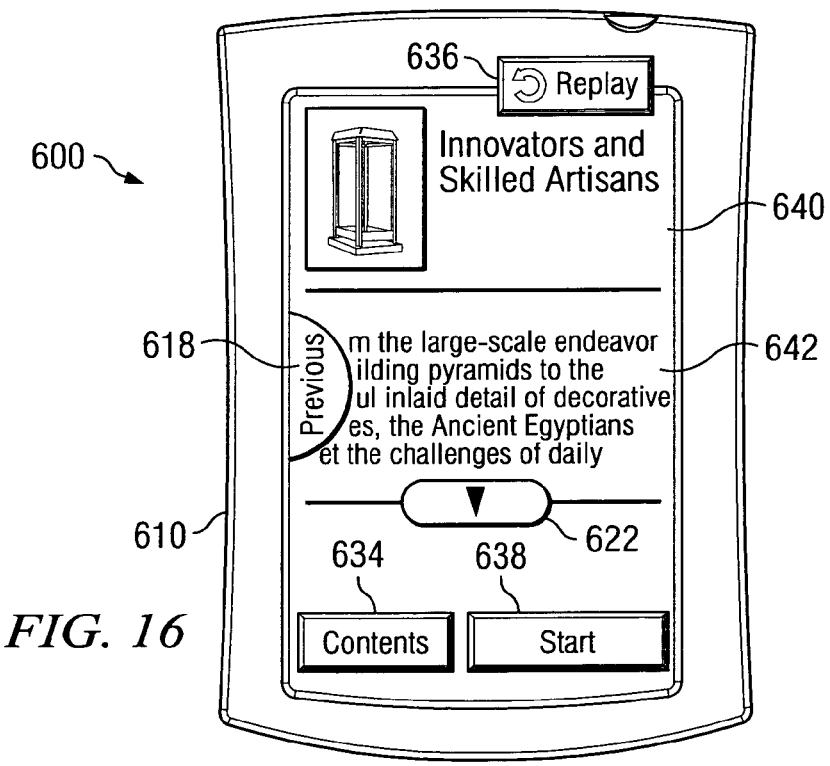
FIG. 16 depicts a channel device application tour selection.

FIG. 16 depicts SACDA 600 showing the first page 640 of the "Innovators and Skilled Artisans" tour (630). The first page 640 provides a "contents" button 634 and a "start" button 638. In addition, "replay" button 636 is provided. If the user clicks on "start" button 638, then the second screen of the "Innovators and Skilled Artisans" tour will be displayed (see FIG. 17). Alternatively, the user may view the contents and select a screen from the contents display (not shown) by clicking on "Contents" button 634.

Figure 17:
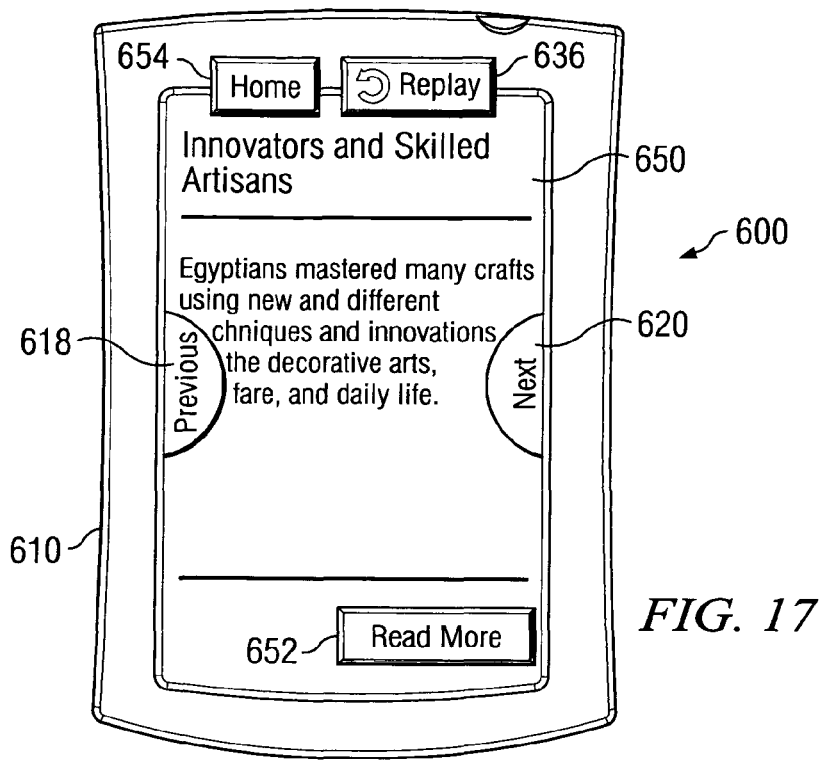
FIG. 17 depicts a channel device application linked display.

FIG. 17 depicts SACDA 600 depicting second page 650 of the "Innovators and Skilled Artisans" tour. "Read more" button 652 is provided. "Read more" button 652 allows the user to access an element with a textual representation that is related to the element displayed on page 650. "Home" button 654 is also provided which, by way of example, may return the user to the "Select a Tour" display of FIG. 15.

Figure 18:
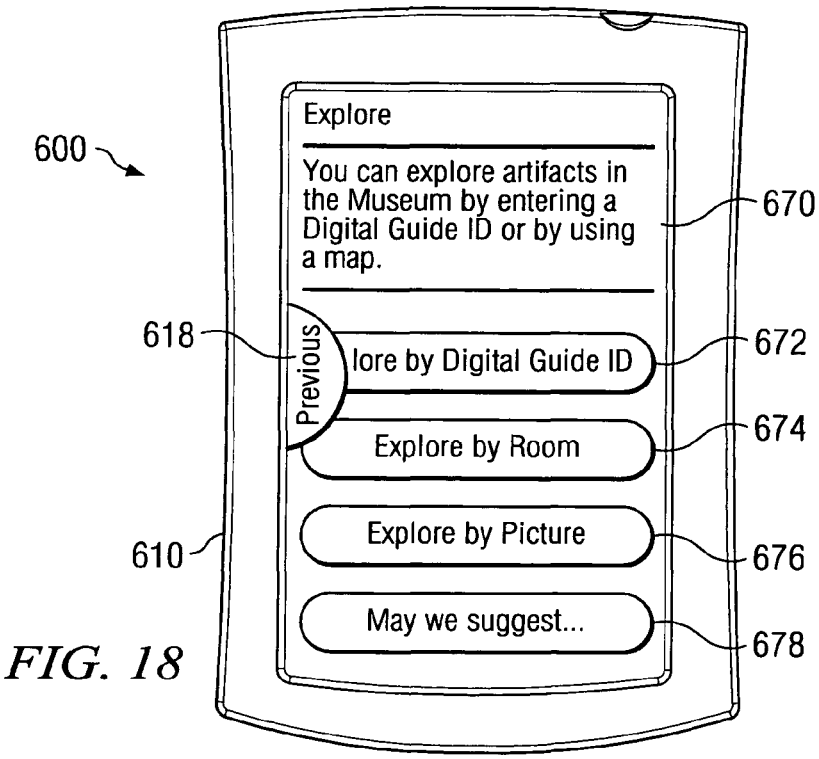
FIG. 18 depicts a channel device application exploration menu.

FIG. 18 depicts SACDA 600 showing "explore" page 670. Explore page 670 offers a menu for the user to select from a variety of ways to explore museum including "by digital guide ID" 672, "by room" 674, "by picture" 676 or "by digital guide suggestion" 678.

Figure 19:
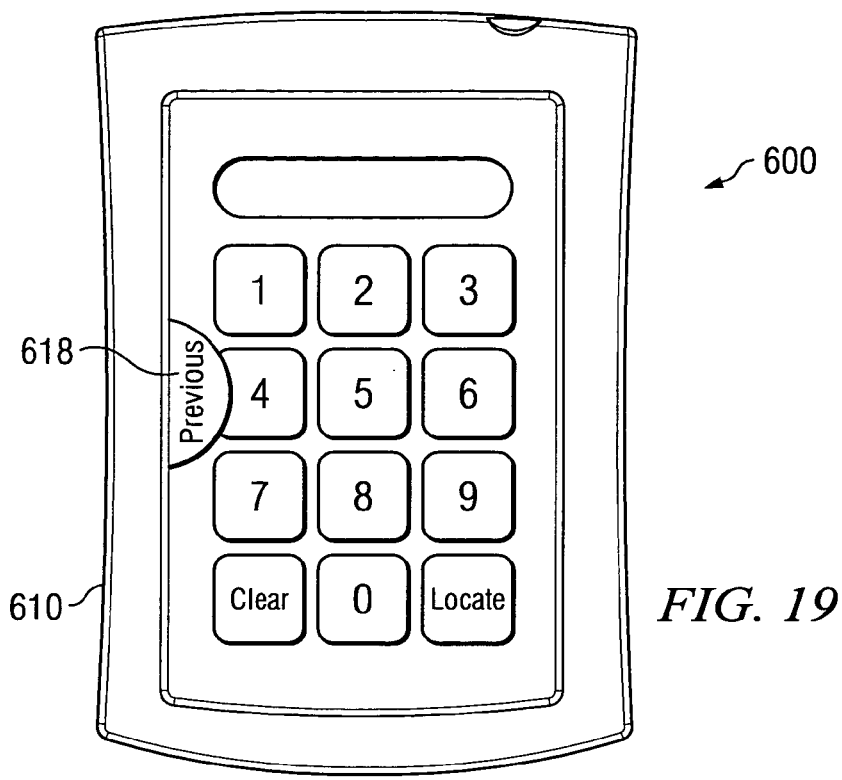
FIG. 19 depicts a channel device application touchpad.

FIG. 19 depicts SACDA 600 displaying a numerical pad. The numerical pad may be used to locate an element by its unique identifying number. Correspondingly, an object may be located by entering the numerals of its pervasive identifier.

Figure 20:
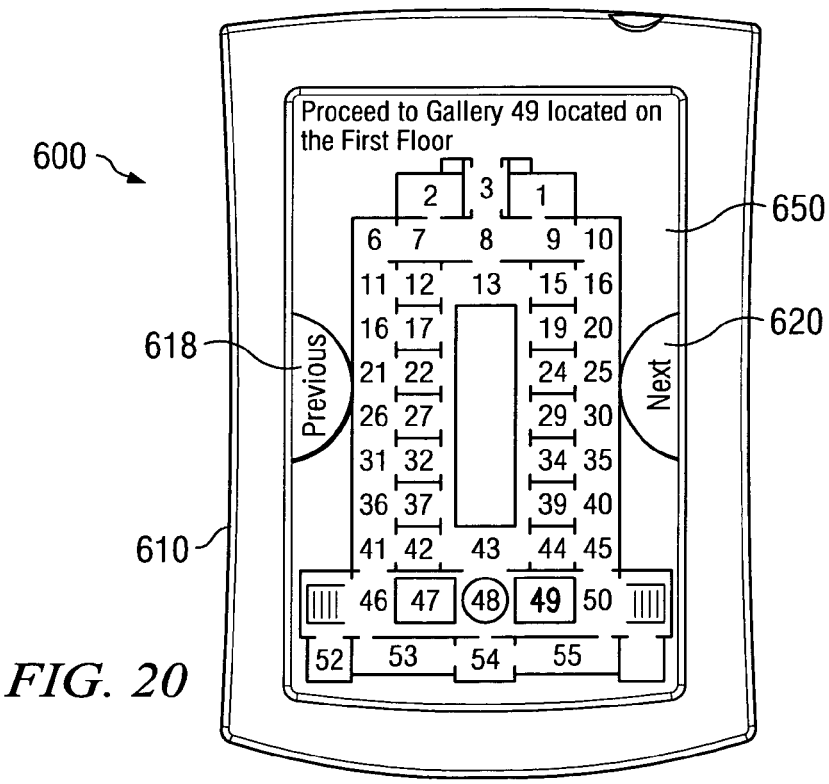
FIG. 20 depicts a channel device application map display.

FIG. 20 depicts SACDA 600 showing floor map 650. In the example provided, floor map 650 displays the floor plan for the first floor of a museum with instructions for the user to proceed to gallery 49. The numeral 49 corresponds to the pervasive identifier for the object displayed in the gallery 49 on floor map 650. The user follows the floor map to reach gallery 49. The user may click on the numeral 49 to obtain content information about the object with pervasive identifier 49, or alternatively, the user may go to a numerical pad such as the numerical pad shown in FIG. 19 and obtain content information about the object with pervasive identifier 49 by entering the numeral 49. In either event, a new screen would be displayed with content information regarding the object (See FIG. 21).

Figure 21:
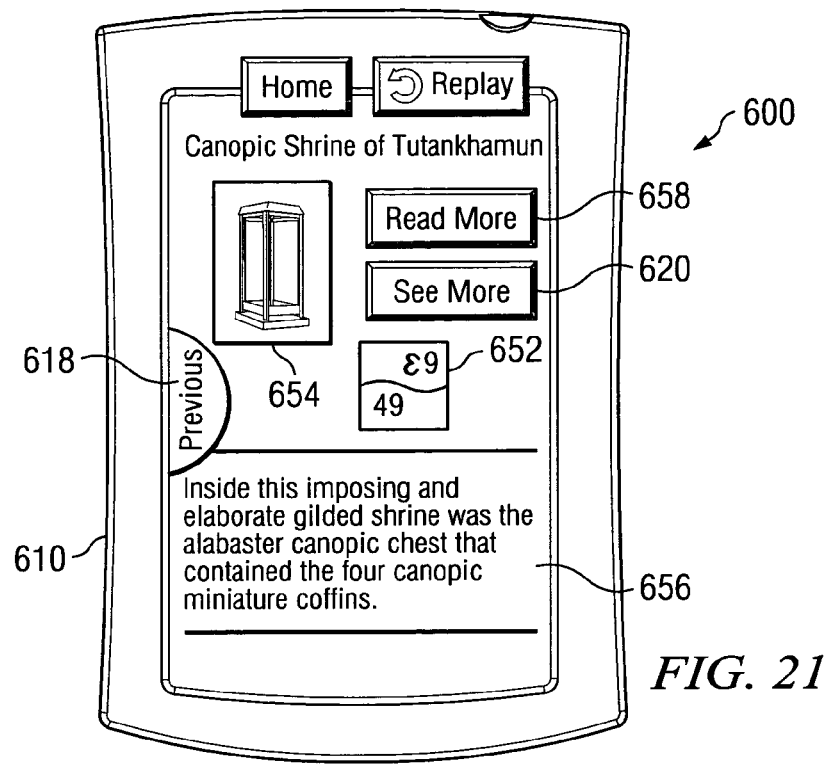
FIG. 21 depicts a channel device application representation of an object.

FIG. 21 depicts SACDA 600 with content information regarding the object having numeral 49 as its pervasive identifier. The pervasive identifier is displayed in section 652. In the example shown, the object with the numeral 49 as its pervasive identifier is the "Canopic Shrine of Tutankhamum" with a representation 654. In the example provided, "Read more" button 658 allows the user to access an element with a textual representation that is related to the element displayed on page 656. "See more" button 620 allows the user to access an element with a pictorial, visual or animated representation that is related to representation 654 on page 656.

Figure 22:
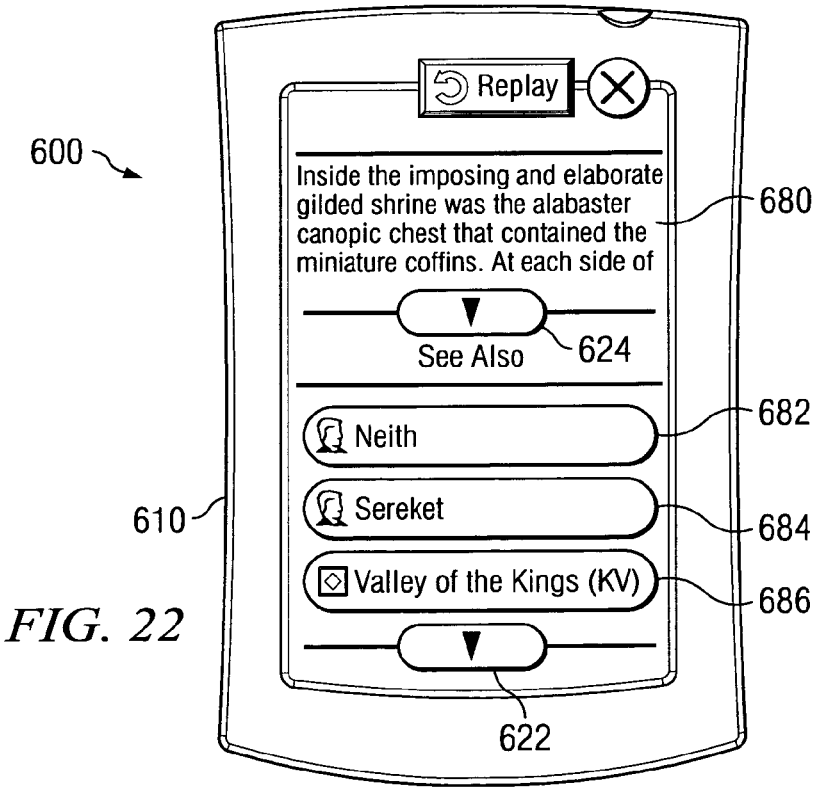
FIG. 22 depicts a channel device application linked textual element.

FIG. 22 depicts SACDA 600 showing an example of a screen that would be displayed if the user clicked on the "Read More" button 658 of FIG. 21. Additional text is displayed. The additional text is a representation of an element linked to the textual element displayed in FIG. 21. SACDA 600 further displays links to related elements such as character element "Neith" 682, character element "Sereket" 684 and place element, "Valley of the Kings" 686. The user may then choose to click on one of the character elements or the location element. If the user clicked on the location element "Valley of the Kings" 686, then a new screen such as shown in FIG. 23 would be displayed.

Figure 23:
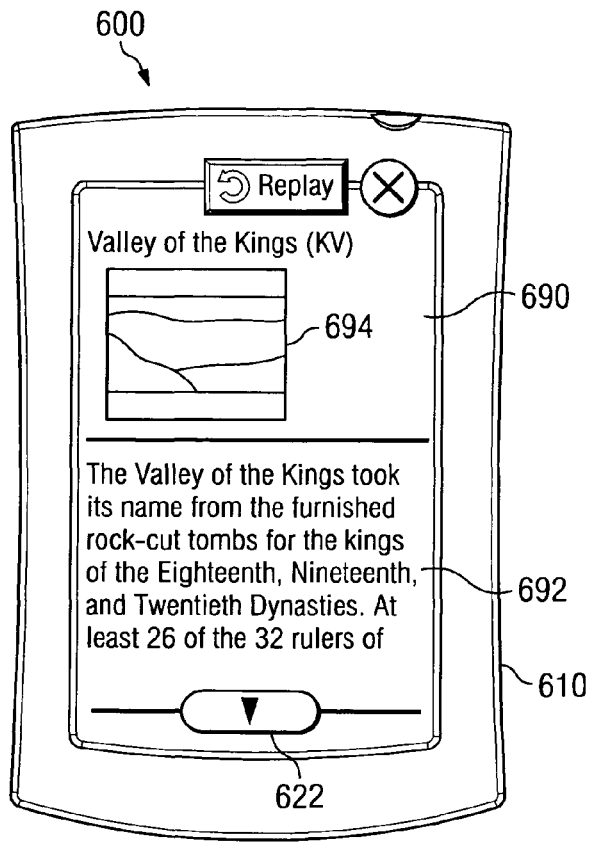
FIG. 23 depicts a channel device application thematically linked representation of a place.

FIG. 23 depicts SACDA 600 showing an example of the first page to be displayed if the user clicked on "Valley of the Kings" 686 in FIG. 22. In the example, representation 694 is a picture of the present day area known as the "Valley of the Kings" is shown and text 692 is displayed.

SACDA 600 is an example of a stand alone digital guide device. As such, SACDA 600 would contain an extract of the total content information in content repository 114 (See FIG. 1). Persons skilled in the art are aware that a digital guide device may be linked by a web based browser such as web browser 142 or by a network application such as network application 144 to a database such as database 126 (see FIG. 2) and have full access to all of the content information in CR 114. Movement between pages on a digital guide device is based upon the hierarchial organization of content information into elements, modules and stories. Linking related elements, modules and stories, allows movement by the user from one page to the next in a variety of paths by using buttons on the digital guide device.

Channel Administration Application

Channel administration application (CA) 130 (see FIG. 1) is a browser-based registration and device management application. CA 130 delivers content information to devices in channels designated for that content information by the CMS. The CA further collects and graphs user demographics and statistics and creates a personalized summary of the use of the digital guide device that can be printed and/or e-mailed to the end-user. CA 130 accomplishes these functions through a first program, a second program, and a third program.

Figure 24:
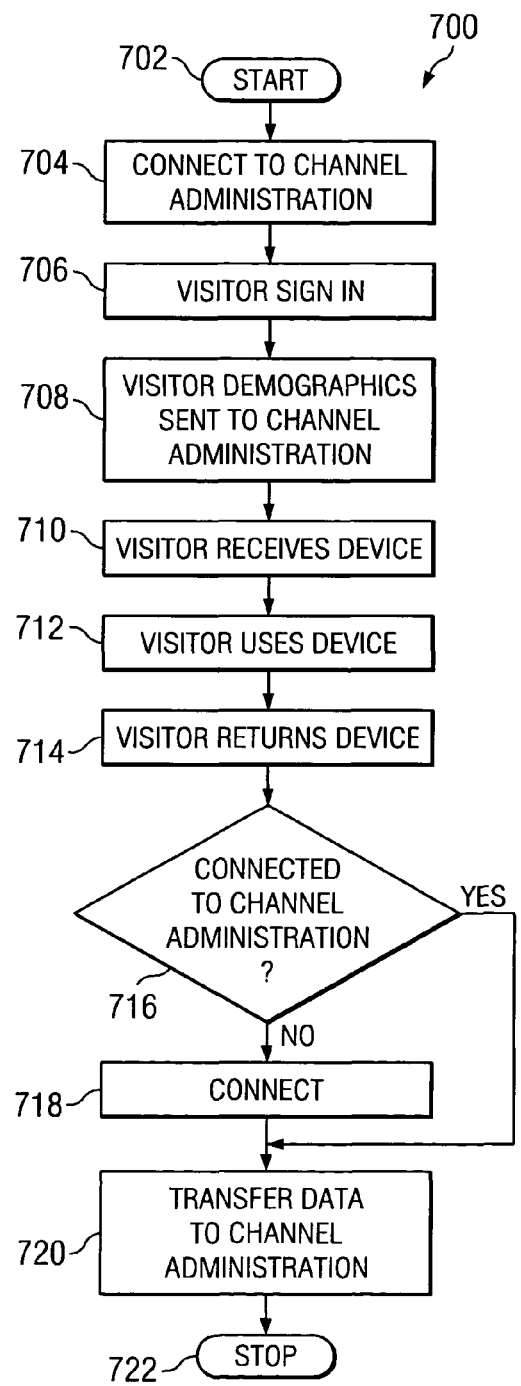
FIG. 24 depicts a flow chart for a channel administration application first program.

FIG. 24 depicts CA first program (CA1) 700. CA1 starts (702) and a connection is established with CA. The tour administration personnel signs in the visitor (706) and the visitor demographics are sent to channel administration (708). The visitor receives a device (710), uses the device (712), and returns the device (714). The tour personnel checks to see there is still a connection to CA (716). If not, a connection is established (718). If there is a connection, CA1 transfers data to CA (720) and CA1 stops (722).

Figure 25:
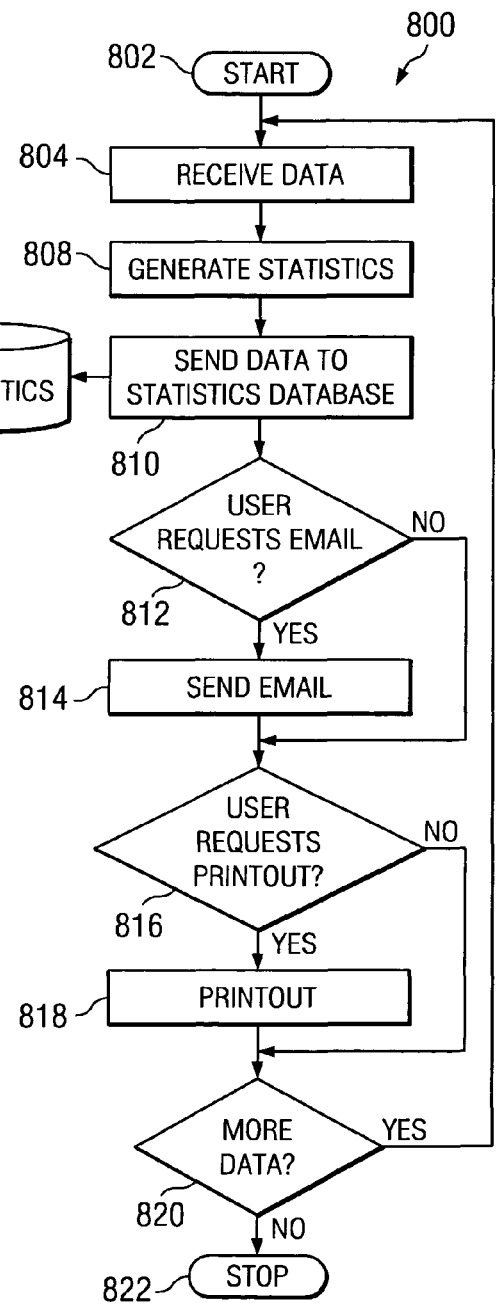
FIG. 25 depicts a flow chart for a channel administration application second program.

FIG. 25 depicts CA second program (CA2) 800. CA2 starts (802) and receives data from CA1. CA2 analyzes the data and generates statistics (808). The statistical data generated is sent to the statistics database 124 and a determination is made as to whether the user requested an e-mail summary (812). If so, an e-mail summary is sent to the user (814). If not, a determination is made as to whether the user requested a printout (816). If so, a print out is made (818). If not, a determination is made whether more data is to be processed (820). If so, CA2 returns to step 804. If not, CA2 stops (822).

Figure 26:
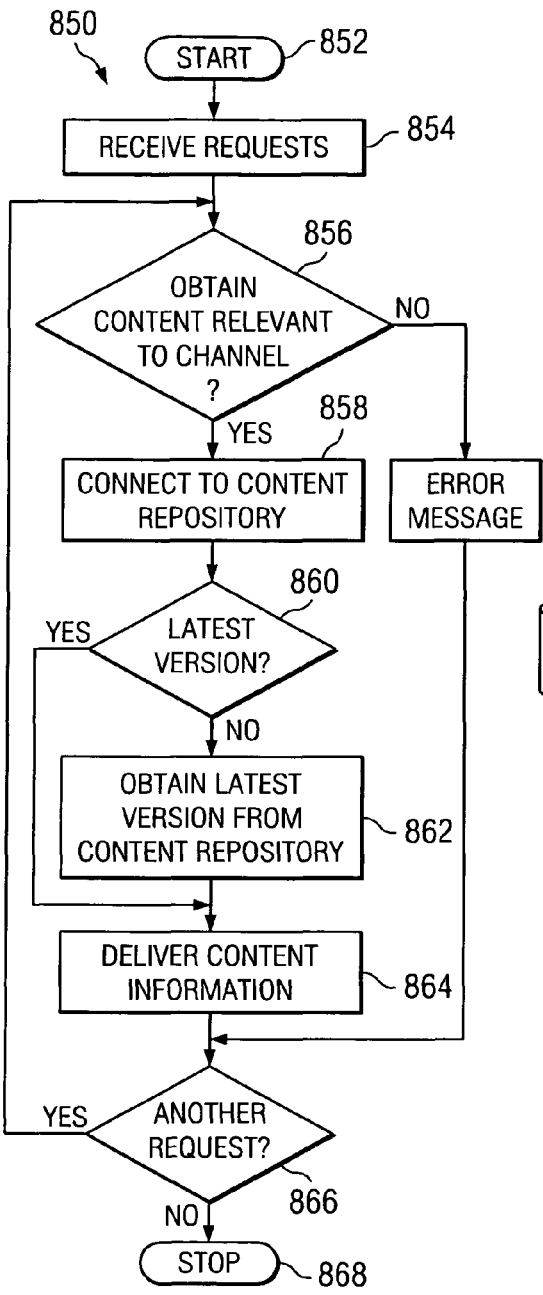
FIG. 26 depicts a flow chart for a channel administration application third program.

FIG. 26 depicts channel administration application third program (CA3) 850. CA3 starts (852). Requests for content information are received from channel applications (854). A determination is made as to whether content information relevant to the channel can be extracted from the CR (856). If not, an error message is displayed, and CA3 goes to step 866. If so, CA3 connects with CR (858). A determination is made as to whether the latest version of the content information is available (860). If not, CA3 obtains the latest version from the content repository (862). If so, CA3 goes to step 864. Content Information is delivered (864). A determination is made as to whether another request is to be made (856). If so, CA3 goes to step 856. If not, CA3 stops (868).

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed:

1. A digital guide system comprising:
   a content repository containing a content information;
   a server computer having a first memory and a first processor connected to the content repository by a network; and
   a content management system application in the first memory for creating and assembling the content information;
   wherein, a channel device application receives the content information from the content repository and transmits the content information to a channel device;
   wherein the content information is created, edited, assembled, approved and published in accordance with an access right granted within the content management system application; and
   wherein the content information enables a user to locate an object within a physical location and provides current information regarding the object, relating the object to the physical location, and relating the object to one or more persons associated with the object.

2. The digital guide system of claim 1 further comprising a custom pronunciation database containing a plurality of custom pronunciations connected to the content management system application by the network.

3. The digital guide system of claim 1 further comprising a text-to-speech application connected to the content management system application by the network.

4. The digital guide system of claim 1 further comprising a text-to-speech application connected to the content management system application and to a custom pronunciation database by the network.

5. The digital guide system of claim 1 wherein the content management system application provides custom pronunciations to the custom pronunciation database.

6. The digital guide system of claim 2 wherein a text-to-speech application accesses the custom pronunciation database via the network.

7. The digital guide system of claim 1 further comprising:
   a text-to-speech application in the first memory; and
   a graphical user interface having a first area for assigning access rights in the content management system application by a user.

8. The digital guide system of claim 7 wherein the graphical user interface further comprises a second area for assigning a role based upon a grouping of access rights.

9. A method for providing a digital guide for a tour of a physical space comprising:
   using a content management system application, creating a content information in a content repository;
   publishing an approved content information from the content repository to a published database; and
   using a channel device having a channel device application, receiving and displaying the approved content information;

wherein the content information is created, edited, assembled, approved and published in accordance with a plurality of access rights granted with a content management system application;

wherein the content information enables a user to locate an object within the physical space; and wherein the content information provides current information regarding the object that relates the object to the physical space, and that relates the object to one or more persons associated with the object.

10. The method of claim 9 further comprising:

using a text-to-speech application, creating an audio file from an approved content information.

11. The method of claim 10 further comprising:

using a custom pronunciation database, obtaining a custom pronunciation and using the custom pronunciation to create the audio file.

12. The method of claim 11 further comprising:

creating custom pronunciation; and storing the custom pronunciation in a custom pronunciation database connected to the text-to-speech application.

13. A digital guide system comprising:

a channel for carrying a content information in digital form and presenting the content information in an audio, visual or audio visual display;

a channel administration application that delivers the content information through the channel to a channel device having a channel device application where the channel device application has been assigned to the content information by a content management system;

a channel device application that receives the content information from the channel administration application;

a content management system application that manages the production of the content information by assigning access rights, assembling the content information in a plurality of elements, modules and stories, assigning channels to the content information, translating approved content information into audio files using a text-to-speech application, and when requested, providing the content information to the channel administration application for distribution to the channel device application;

wherein the content information is created, edited, assembled, approved and published in accordance with an access right granted within the content management system application;

wherein the channel device application enables a user to locate the object within a physical location, and provides current information regarding the object that relates the object to the physical location, and that relates the object to one or more persons associated with the object; and wherein the channel device application collects usage information from a channel device user log for transmission to a channel administration application.

* * * * *